US008116405B2

(12) United States Patent
Cho et al.

(10) Patent No.: US 8,116,405 B2
(45) Date of Patent: Feb. 14, 2012

(54) METHOD AND APPARATUS FOR TIME SYNCHRONIZATION USING GPS INFORMATION IN COMMUNICATION SYSTEM

(75) Inventors: Jae-Hun Cho, Suwon-si (KR); Byung-Duck Cho, Seoul (KR); Yun-Je Oh, Yongin-si (KR); Seong-Taek Hwang, Pyeongtaek-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 937 days.

(21) Appl. No.: 12/104,662

(22) Filed: Apr. 17, 2008

(65) Prior Publication Data

US 2009/0034672 A1 Feb. 5, 2009

(30) Foreign Application Priority Data

Apr. 17, 2007 (KR) .................. 10-2007-0037343

(51) Int. Cl.
*H03K 9/00* (2006.01)
*H04L 27/00* (2006.01)
(52) U.S. Cl. ........ 375/316; 375/356; 375/364; 370/503; 370/509; 370/510; 342/357.22
(58) Field of Classification Search .................. 375/316, 375/356, 364; 370/503, 509, 510; 342/357.22
See application file for complete search history.

(56) References Cited

U.S. PATENT DOCUMENTS

| | | | |
|---|---|---|---|
| 7,333,725 B1 * | 2/2008 | Frazier .......................... 396/263 |
| 7,589,595 B2 * | 9/2009 | Cutler ............................ 331/18 |
| 7,831,000 B2 * | 11/2010 | Wang et al. .................... 375/354 |
| 7,876,790 B2 * | 1/2011 | Cho et al. ....................... 370/503 |
| 2002/0123365 A1 * | 9/2002 | Thorson et al. ............... 455/524 |
| 2006/0280182 A1 * | 12/2006 | Williams et al. .............. 370/394 |
| 2007/0207836 A1 * | 9/2007 | Gormley et al. .............. 455/561 |
| 2009/0086764 A1 * | 4/2009 | Lee et al. ....................... 370/503 |

FOREIGN PATENT DOCUMENTS

| | | |
|---|---|---|
| KR | 2003-1228 | 1/2003 |
| KR | 2005-113365 | 12/2005 |

OTHER PUBLICATIONS

IEEESTD.2002.94144, "IEEE Standard for a Precision Clock Synchronization Protocol for Networked Measurement and Control Systems", 2002. vol. 1, p. 1-1444.*

Balasubramanian, S., "A Frequency Compensated Clock for Precision Synchronization using IEEE 1588 Protocol and its Application to Ethernet", Rockwell Automation, Sep. 24, 2003, http://ieee1588.nist.gov/z_RA_1_FreqCompClk.pdf.*

* cited by examiner

*Primary Examiner* — Shuwang Liu
*Assistant Examiner* — Sung Ahn
(74) *Attorney, Agent, or Firm* — Cha & Reiter, LLC (57) ABSTRACT

A method and apparatus for time synchronization (TS) method using GPS information in a communication system synchronizing the time of slave nodes, which do not have a GPS receiver, by using GPS information of a node having a GPS receiver. The method includes the steps of extracting 1PPS, TOD, 1PPS_en, and clocks using GPS signals by a grand master node having a GPS receiver, stabilizing the signals, generating a sync message for TS, and transmitting the sync message to a slave node; receiving the sync message by the slave node and conducting a TS operation using OFCC synchronization technology extracting 1PPS, TOD, and 1PPS_en signals using the modified TOD information by the block and delivering to a stabilization block of the slave node for stabilization; and redelivering to the TS block to update TOD information and generate a sync message for TS of a second slave node.

21 Claims, 6 Drawing Sheets

METHOD AND APPARATUS FOR TIME SYNCHRONIZATION USING GPS INFORMATION IN COMMUNICATION SYSTEM

CLAIM OF PRIORITY

This application claims priority under 35 U.S.C. §119 from an application entitled "Method and Apparatus for Time Synchronization Using GPS Information in Communication System" filed with the Korean Intellectual Property Office on Apr. 17, 2007 and assigned Serial No. 2007-37343, the contents of which are incorporated herein by reference in its entirety.

BACKGROUND OF THE INVENTION

1. Field of the Invention

The present invention relates to a method for synchronizing the time of peripheral nodes in wireless communication networks. More particularly, the present invention relates to synchronizing the time of nodes, such as peripheral nodes, which have no GPS (Global Positioning System) receiver, by using GPS information of a node having a GPS receiver in a communication system.

2. Description of the Related Art

A GPS service is generally provided in the following manner: GPS signals are received from at least three GPS satellites, and accurate time and distance are measured from them by a triangulation method. In other words, based on the triangulation of three different distances, the user is provided with information regarding the accurate current position so that he/she can recognize his/her position. The GPS service has also been extended to a navigation service, which uses additional data (e.g. maps, traffic information) so that, when the user selects a specific destination, he/she is provided with specific information regarding the roads leading from the current position to the destination, which sometimes even includes commands to turn or exit onto intersecting roadways, and other available traffic services, etc. The GPS is also used in other fields including geodetic survey, measurement, military purposes, aviation control, etc.

The synchronization of systems or networks is a crucial factor in wireless communication systems. A typical example of current methods for synchronizing wireless communication networks uses GPS satellites and commonly adopts point-to-point topology between receivers and GPS satellites to receive GPS signals.

Figure 1:
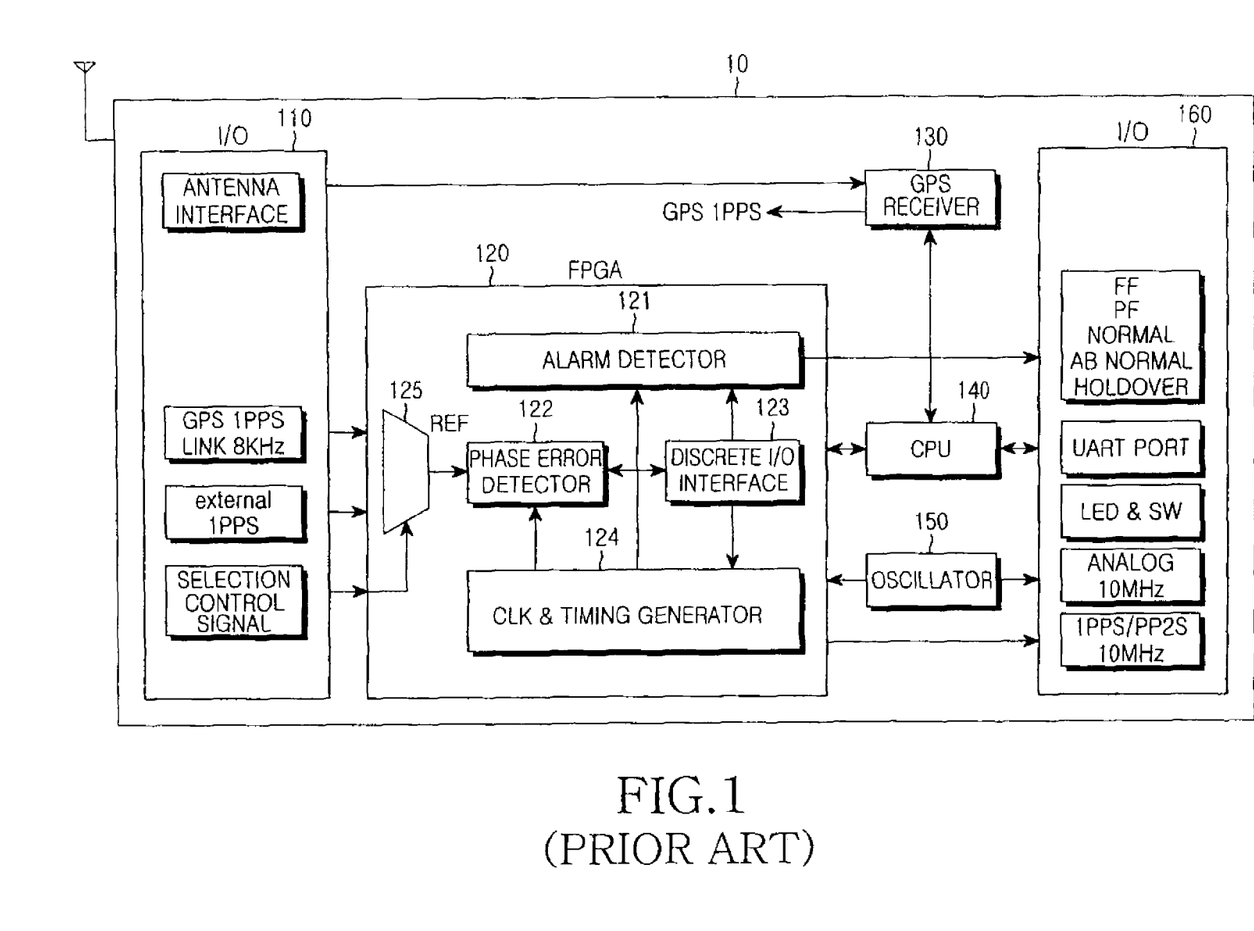
FIG. 1 is a block diagram showing the construction of a conventional GPS receiver.

FIG. 1 is a block diagram showing the construction of a conventional GPS receiver that uses information from GPS satellites for time synchronization. The GPS receiver uses inputted 8 KHz signals, which are synchronized with GPS signals or GPS 1PPS (Pulse Per Second), as the reference to provide the system with 10 MHz, PP2S (Pulse Per 2 Second), and 1PPS signals that are synchronized therewith.

Still referring to FIG. 1, the GPS receiver 10 includes an antenna interface 110, an FPGA (Field-Programmable Gate Array) 120, a GPS reception unit 130 (hereafter "GPS receiver"), a CPU 140, an oscillator 150, and an input/output unit 160.

The antenna interface 110 is adapted to receive L1 signals from a GPS reception antenna and supply 1PPS signals synchronized with UTC (Coordinated Universal Time). The antenna interface 110 also checks the condition of physical connection with the GPS reception antenna and reports the check result to the system.

The FPGA 120 includes an alarm detector 121 for determining whether or not each Voltage Controlled Oscillator (VCO) inside the GPS receiver 10 has provided an output, whether or not the power is functioning normally, etc. and reporting the result to the CPU 140; a multiplexer 125 for receiving external 1PPS signals and 8 KHz signals synchronized with GPS 1PPS; a phase error detector 122 for receiving an output of the multiplexer 125, which is selected based on a selection control signal, and checking the phase error of received signals; a discrete I/O interface 123 adapted for input/output of signals among a CLK and timing generator 124, the phase error detector 122, and the alarm detector 121; and a CLK and timing generator 124 for generating 1PPS and PP2S output signals required by the system by using GPS or synchronized 10 MHz clocks.

The GPS receiver 130 processes GPS signals received by the antenna interface 110 and provides GPS 1PPS signals.

The CPU 140 is responsible for controlling respective components of the GPS receiver 10 during a GPS reception operation, evaluating an alarm reported by the alarm detector 121, and reporting the current reception condition of the GPS receiver 10 to the system. The current reception condition reported includes at lest one of a FF (Function Failure) condition, a PF (Power Failure) condition, a normal condition, an abnormal condition, and a holdover condition.

Still referring to FIG. 1, the oscillator 150 consists of an OCXO (Oven Controlled X-tal (crystal) Oscillator) or a TCXO (Temperature-Compensated X-tal (crystal) Oscillator), and provides output signals having a mechanically or physically stable oscillation frequency.

The basis of operation of the OCXO is that the crystal is sensitive to changes in temperature. In particular, an oven is used to maintain the temperature around the crystal at a constant level so that no error occurs. The OCXO has the highest level of precision among crystal-applied products. However, the OCXO is bulky and uses various levels of power (12V, 24V, 30V) for operation, and thus the OCXO typically finds use for repeaters or for military purposes (e.g. missiles, satellites) than for personal portable communication.

On the other hand, the TCXO is less expensive than the OXCO, and is commonly used for conventional GPS receivers. The TCXO adopts a temperature compensation circuit, a thermistor, and a VCO (Voltage Controlled Oscillator) to improve the operating performance of the crystal. The temperature compensation circuit limits the change of the TCXO output frequency as the operating temperature varies. The thermistor reduces the oscillation frequency error of the oscillator, which depends on temperature. The VCO has a high level of frequency stability against temperature changes ranging from a number of MHz to tens of MHz, and is widely used as the reference frequency source.

The input/output unit 160 shown in FIG. 1 provides the user with a UART (Universal Asynchronous Receiver/Transmitter) port comprising a debug port and a TOD (Time Of Day) port. The input/output unit 160 uses the TOD port to enable real-time monitoring of the current TOD data and to provide remote control and download functions.

Based on a predetermined reference (e.g. midnight, Jan. 6, 1980), the TOD port counts the currently received 1PPS from the first GPS 1PPS to provide accurate time information. The 1PPS comprises an accurate timing signal, with which each node synchronizes all clocks used in the system.

Conventional methods for synchronization of wireless communication networks employ the above-mentioned GPS receivers to receive GPS information from GPS satellites and conduct synchronization. However, these methods have a problem in that, if GPS information is not properly received from GPS satellites (e.g. in downtown areas with many skyscrapers or obstacles, indoor environments where GPS signals are hardly received), the system cannot be synchronized as desired. In systems which may sometimes include navigation directions, the lack of synchronization can have significant consequences on the system.

SUMMARY OF THE INVENTION

Accordingly, the present invention has been made in part to solve at least some the above-mentioned problems occurring in the prior art, and to provide the advantages discussed herein below. One aspect of the present invention is to provide an apparatus and a method for synchronizing the time of slave nodes, which have no GPS receiver, by using GPS information of a node having a GPS receiver in a communication system.

Accordingly, the present invention provides a time synchronization method using GPS information in a communication system, the method including the steps of extracting 1PPS (Pulse Per Second), TOD (Time Of Day), 1PPS_en, and 10 MHz clocks by using GPS signals by a grand master node having a GPS receiver, stabilizing the extracted signals, generating a sync message for time synchronization by using the stabilized signals, and transmitting the sync message to a slave node; receiving the sync message by the slave node and conducting a time synchronization operation by using OFCC (Offset & Frequency Compensation Clock) synchronization technology supporting separate compensation of time offset and frequency by a time synchronization block of the slave node so that TOD information of the time synchronization block is modified; extracting 1PPS, TOD, and 1PPS_en signals by using the modified TOD information by the time synchronization block and delivering the extracted signals to a stabilization block of the slave node so that the signals are stabilized; and delivering the stabilized signals to the time synchronization block again to update TOD information of the time synchronization block and generating a sync message for time synchronization of a second slave node by using the updated TOD information.

In accordance with another aspect of the present invention, there is provided a time synchronization apparatus using GPS information in a communication system, the apparatus including a grand master node having a GPS receiver for extracting 1PPS, TOD, 1PPS_en, 10 MHz clocks by using GPS signals received from the GPS receiver, stabilizing the extracted signals, generating a sync message for time synchronization of a slave node by using the stabilized signals, and transmitting the sync message to the slave node. At least one slave node receives a sync message for time synchronization from the grand master node or from a second slave node, for conducting a time synchronization operation by using OFCC synchronization technology supporting separate compensation of time offset and frequency by a time synchronization block of the slave node so that TOD information of the time synchronization block is modified, extracting 1PPS, TOD, and 1PPS_en signals by using the modified TOD information, delivering the extracted signals to a stabilization block of the slave node to stabilize the signals, delivering the stabilized signals to the time synchronization block again to update TOD information of the time synchronization block, and for generating a sync message for time synchronization of a third slave node by using the updated TOD information.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION

Hereinafter, exemplary embodiments of the time synchronization method and apparatus according to the present invention will be described in detail with reference to the accompanying drawings. The exemplary embodiments are provided for illustrative purposes, and a person of ordinary skill in the art will appreciate that the invention is not limited to the examples shown and described herein. For the purposes of clarity and simplicity, a detailed description of known functions and configurations incorporated herein may be omitted to avoid making the subject matter of the present invention unclear to a person of ordinary skill in the art.

The time synchronization method according to the present invention typically uses GPS information in a communication system. According to an exemplary embodiment of the present invention, it is proposed that, in order to synchronize the time of a node not having a GPS receiver in an Ethernet system, signals of a node having a GPS receiver are received and processed to synchronize the time of the node that does not have a GPS receiver (or access to GPS information).

The time synchronization apparatus using GPS information according to an exemplary embodiment of the present invention includes a grand master node having a GPS receiver and at least one slave node that does not have a GPS receiver. The grand master node and the slave node include a time synchronization block for conducting a time synchronization operation and a stabilization block for stabilizing outputted signals and generating desired clocks and pulses.

The time synchronization technology adopted by the present invention is based on IEEE 1588 protocol standards for synchronization, and employs Offset & Frequency Compensation Clock (OFCC) synchronization technology so that, in multi-hop environments, a much improved Jitter variation value can be obtained. In particular, the time synchronization technology is based in part on IEEE 1588 Version 1 (2002). The OFCC technology is based on Korean Patent Application No. 10-2006-0039606 (filed May 2, 2006 in the name of Samsung Electronics). The OFFCC time synchronization technology referred to in the present invention will be described later in more detail.

Figure 2:
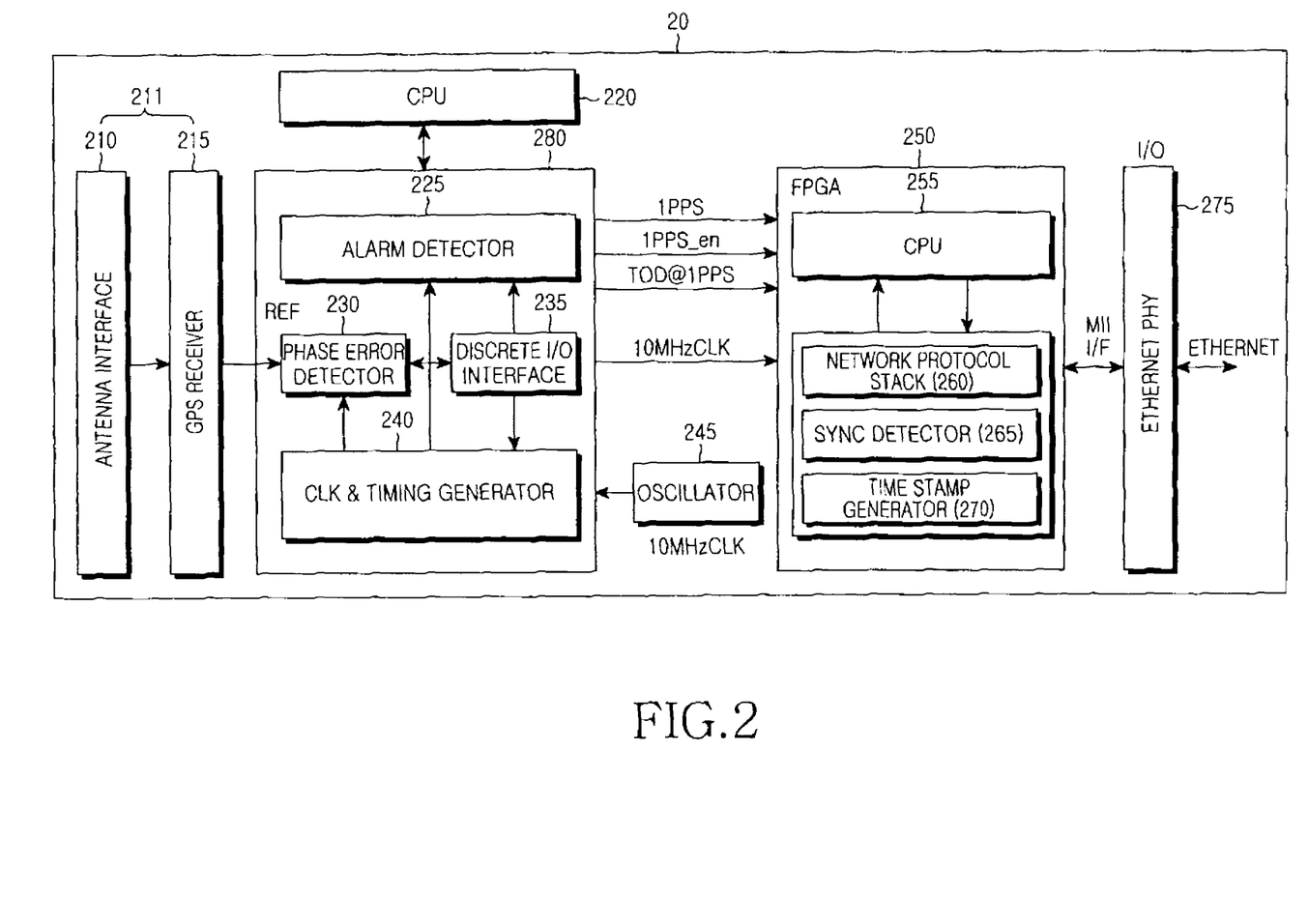
FIG. 2 is a block diagram showing the construction of a grand master node according to an exemplary embodiment of the present invention.

FIG. 2 is a block diagram showing an illustrative example of the construction of a grand master node according to an exemplary embodiment of the present invention. The grand master node 20 typically includes a GPS reception unit 211, CPU 220, oscillator 245, time synchronization block 250, stabilization block 280, and Ethernet PHY 275.

Referring to FIG. 2, the grand master node 20 according to this exemplary embodiment of the present invention includes a GPS reception unit 211 for receiving GPS signals from GPS satellites, a stabilization block 280 for generating stabilized clocks and pulses for time synchronization by using the GPS signals received by the GPS receiver 215, and a time synchronization block 250 for conducting a time synchronization operation and creating a sync message for time synchronization of the slave node according to IEEE 1588 standards.

The GPS reception unit 211 includes an antenna interface 210 for receiving L1 signals from a GPS antenna, supplying 1PPS (Pulse Per second) signals synchronized with the UTC, checking the condition of physical connection with the GPS reception antenna, and reporting the checked result to the system. Additionally the GPS reception unit includes a GPS receiver 215 for processing GPS signals received by the antenna interface and supplying the stabilization block 280 with GPS 1PPS signals.

Still referring to FIG. 2, the stabilization block 280 includes: an alarm detector 225 for determining whether or not each VCO inside the GPS reception device has provided an output, whether or not the power is functioning normally, etc. and for reporting the result to the CPU 220; a phase error detector 230 for receiving OPS signals from the OPS reception unit 215 and checking the phase error of received signals; a discrete input/output interface 235 adapted for input/output of signals among a clock and timing generator 240, the phase error detector 230, and the alarm detector 225; a clock and timing generator 240 for generating 1PPS and PP2S (Pulse Per 2 Second) output signals required by the system by using GPS or synchronized 10 MHz clocks; and an oscillator 245 consisting of an OCXO (Oven Controlled X-tal (crystal) Oscillator) or a TCXO (Temperature-Compensated X-tal (crystal) Oscillator) to provide output signals having a mechanically or physically stable oscillation frequency.

The time synchronization block 250 shown in FIG. 2 includes a network protocol stack 260 for conducting communication according to IEEE 1588 standards, a sync detector 265 for detecting a sync message and identifying a message according to IEEE 1588 standards, a time stamp generator 270 for generating a time stamp for time synchronization of the slave node according to IEEE 1588 standards, and a CPU 255 for controlling respective components of the time synchronization block 250 during a time synchronization operation.

The network protocol stack 260 shown in FIG. 2 refers to a set of programs and procedures that can be executed to process packets transmitted over the network, and the packets may follow a designated protocol.

The grand master node 20 also includes an Ethernet PHY 275 (commonly referred to as an Ethernet physical layer or an Ethernet transceiver), which includes an Ethernet standard interface.

The time synchronization operation of the grand master node 20, which has the above-mentioned exemplary construction shown in FIG. 2, will now be described.

Still referring to FIG. 2, the stabilization block 280 having a GPS receiver extracts a 1PPS signal, TOD (Time Of Day) information at the moment of generation of the 1PPS signal, and a 1PPS_en signal to deliver them to the time synchronization block 250. The reason the 1PPS_en signal is used is as follows: the extraction of TOD occurs subsequent in time to that of 1PPS signal, and the 1PPS_en signal is used to inform that data at the moment of generation of 1PPS is TOD data extracted after a delay. The 10 MHz clock is provided by the oscillator 245 and the 10 MHz clock is synchronized with a 10 MHz clock provided by a GPS reception unit 211 and then transmitted to a time synchronization block 250.

The extracted 1PPS, 1PPS_en, and TOD of the stabilization block 280, as well as the 10 MHz clock from oscillator 245 provided to clock and timing generator 240, are delivered to the time synchronization block 250. It is to be noted that the 1PPS signal, 10 MHz clock, and TOD signal delivered to the time synchronization block 250 have undergone a digital PLL (Phase Locked Loop) to improve the phase error and frequency accuracy/stability.

The time synchronization block 250 exchanges Ethernet-based sync messages with the slave node 30 to synchronize the time of both nodes.

Figure 3:
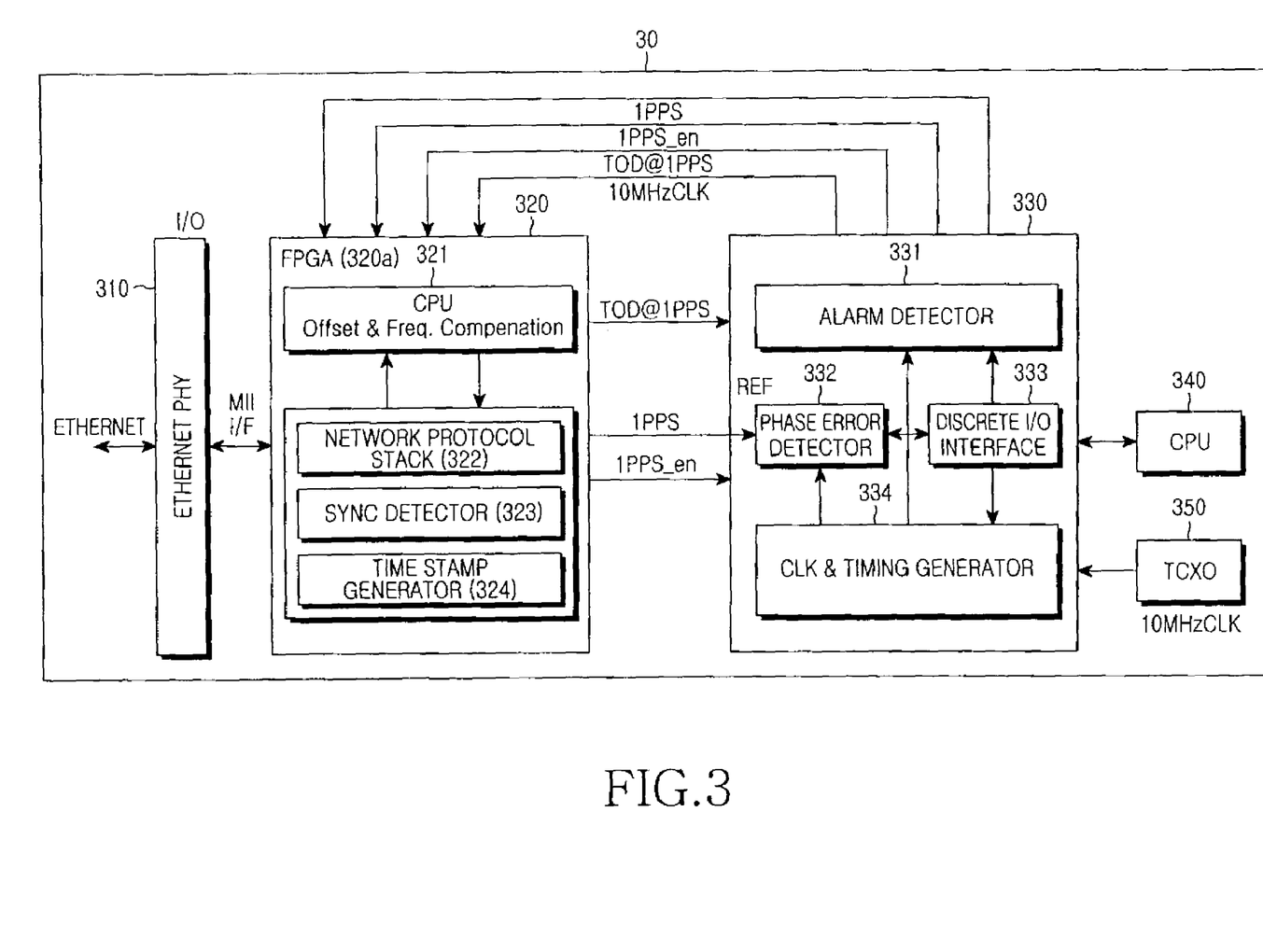
FIG. 3 is a block diagram showing the construction of a slave node according to an exemplary embodiment of the present invention.

FIG. 3 is a block diagram showing an illustrative construction of a slave node according to an exemplary embodiment of the present invention. The construction of a slave node 30 according to this exemplary embodiment of the present invention will be described in detail with reference to FIG. 3. A person of ordinary skill in the art understands and appreciates that other configurations are within the spirit of the invention and the scope of the appended claims.

The slave node according to an exemplary embodiment of the present invention includes a time synchronization block 320 for conducting a time synchronization operation by using a sync message received from the grand master node or from another slave node, and a stabilization block 330 for stabilizing outputted signals and generating desired clocks and pulses, an Ethernet PHY 310, CPU 340 and TCXO 350.

Still referring to FIG. 3, the time synchronization block 320 comprises an FPGA 320a typically includes a network protocol stack 322 for conducting communication according to IEEE 1588 standards, a sync detector 323 for detecting a sync message and identifying a message according to IEEE 1588 standards, a time stamp generator 324 for generating a time stamp for time synchronization of the slave node according to IEEE 1588 standards, and a CPU 321 for controlling respective components of the slave node 30 during a time synchronization operation and conducting a time synchronization operation of the slave node according to the OFCC synchronization technique.

The stabilization block 330 shown in FIG. 3 includes an alarm detector 331 for determining whether or not each VCO has an output, whether or not the power is functioning normally, etc. and reporting the result to the CPU 340; a phase error detector 332 for checking the phase error of 1PPS signals inputted from the time synchronization block 320; a discrete input/output interface 333 adapted for input/output of signals among the alarm detector 331, the phase error detector 332, and a clock and timing generator 334; a clock and timing generator 334 for generating clocks and pulses for time synchronization; a CPU 340 for controlling respective components of the stabilization block 330 during a time synchronization operation; and a TCXO 350 for providing output signals having a stable oscillation frequency.

The slave node 30 includes an Ethernet PHY 310 (commonly referred to as an Ethernet physical layer or an Ethernet transceiver), which includes an Ethernet standard interface.

The time synchronization operation of the slave node, which has the above-mentioned construction, will now be described. The slave node communicates with the grand master node by means of an Ethernet-based Precision Time Protocol (PTP) message. In the case of the PTP message, the time stamp generator 324 of the slave node generates a time stamp according to IEEE 1588 standards. Based on the time stamp information, the CPU 321 inside the FPGA 320a conducts a time synchronization operation through an operation process using the OFCC synchronization technique, and modifies the TOD information of the slave node 30. The FPGA 320a generates one pulse per second by using the TOD information to generate a 1PPS signal. In addition to the 1PPS signal generated in this manner, TOD information at the time of generation of 1PPS and a 1PPS_en signal are delivered to the stabilization block 330. The stabilization block 330 stabilizes the received 1PPS by using a digital PLL and provides TOP information regarding this time. The TOD information is used to generate synchronized PP2S and 10 MHz clocks, which are provided as outputs.

Still referring to FIG. 3, the stabilized 1PPS, 1PPS_en, and TOD, as well as the 10 MHz clock, are again delivered as an input to the time synchronization block to update the TOD information of the time synchronization block. The stabilized TOD information may be used for the role as the master node of another slave node to become a stable synchronization source. As such, each slave node can act as the master node of an adjacent slave node, and a slave node acting as the master node exchanges Ethernet-based PTP messages with the slave node belonging thereto in order to complete multi-hop time synchronization.

Figure 4:
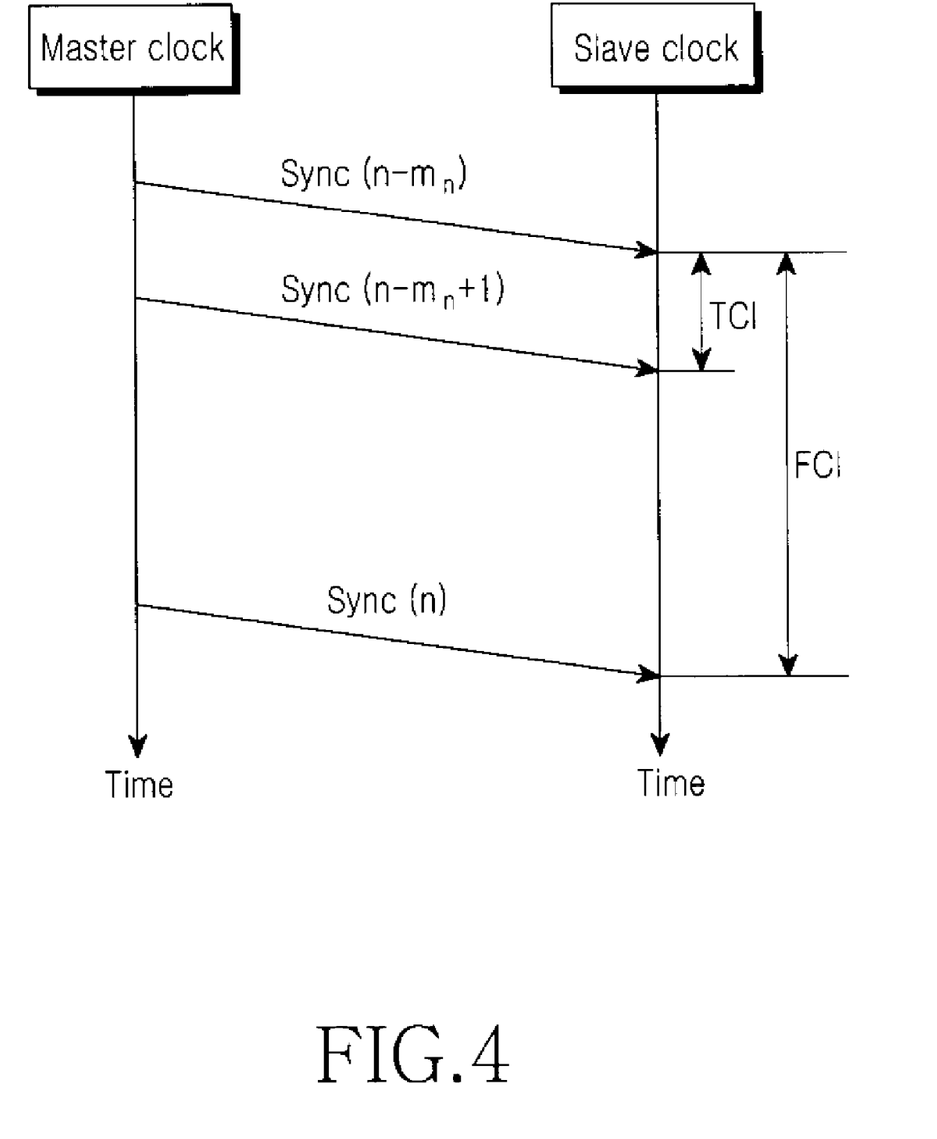
FIG. 4 is a flowchart showing a basic operation procedure in connection with a TCI and an FCI for OFCC time synchronization.

The exemplary OFCC synchronization scheme adopted by the present invention will now be described. Instead of the conventional simultaneous/combined compensation of time offset and frequency, the exemplary OFCC scheme according to the present invention employs an improved method supporting separate compensation of time offset and frequency. FIG. 4 is a flowchart showing a basic operation procedure in connection with time offset and frequency compensation intervals for OFCC time synchronization. Now referring to FIG. 4, based on a time synchronization scheme according to an exemplary embodiment of the present invention, the master clock periodically transmits a sync message [Sync], which includes its launching time, to the slave clock to conduct a time synchronization operation at a predetermined cycle. The present invention in this particular action follows the basic procedure of IEEE 1588 without modification, which includes communication of sync messages, follow-up messages, delay request messages, and delay response messages. However, it is to be noted that according to the present invention the frequency update scheme adopted by the slave clock is improved to support the separate compensation of time offset and frequency according to the characteristics of the present invention, instead of the conventional simultaneous/combined compensation of time offset and frequency.

More particularly, the present invention typically employs two intervals based on the synchronization cycle, i.e. TCI (Time Offset Compensation Interval) and FCI (Frequency Compensation Interval), so that the time offset compensation and the frequency compensation operations are conducted at cycles based on corresponding intervals. The TCI refers to the interval of two adjacent sync messages. The FCI is longer than the TCI, and may be set as a number of TCIs, for example.

The definitions of the TCI and FCI are shown in FIG. 4. In FIG. 4, m refers to the ratio of the TCI to the FCI. The parameter m may be set to be time-dependent. It is also possible to preset the parameter as a fixed number for easier application. In addition, in FIG. 4 n refers to the number of the sync message.

In connection with both intervals (TCI and FCI) mentioned above, the present invention provides a scheme for obtaining two frequency scaling factors as an operation procedure for the slave clock.

1. TCI

Once the slave receives a sync message, the received message is generally used to update its own frequency only for time offset compensation by using a frequency scaling factor calculation method defined by the following Equation 1.

$$\text{FreqScaleFactor}_n = \text{MasterClockCount}_n / \text{SlaveClockCount}_n \quad (1)$$

In Equation 1, $\text{FreqScaleFactor}_n$ refers to a frequency scaling factor; $\text{MasterClockCount}_n = \text{MasterClockTime}_n - \text{MasterClockTime}_{n-1}$; $\text{MasterClockTime}_n = \text{MasterSyncTime}_n + \text{MasterToSlaveDelay}$; $\text{MasterSyncTime}_n$ refers to the time of transmission of the sync message from the master to the slave; MasterToSlaveDelay refers to transmission delay time during transmission of the sync message from the master to the slave; $\text{SlaveClockCount}_n = \text{SlaveClockTime}_n - \text{SlaveClockTime}_{n-1}$; and $\text{SlaveClockTime}_n$ refers to time at which the slave has received the sync message from the master.

2. FCI

According to the characteristics of the present invention, if the $n^{th}$ sync message (current sync message) received by the slave from the previous time of simultaneous compensation of frequency and time offset is the $m_n^{th}$ sync message, a frequency scaling factor calculation method as defined in the following Equation 2 is used to update its own frequency to compensate for both time offset and the frequency.

$$\text{FreqScaleFactor}_n = \frac{\sum_{i=n-m_n+1}^{n} \text{MasterClockCount}_i}{\sum_{i=n-m_n+1}^{n} \text{SlaveClockCount}_i} + \frac{\text{ClockDiffCount}_n}{\text{SlaveClockCount}_n} \quad (2)$$

In Equation 2, $\text{FreqScaleFactor}_n$ refers to a frequency scaling factor; $\text{MasterClockCount}_n = \text{MasterClockTime}_n - \text{MasterClockTime}_{n-1}$; $\text{MasterClockTime}_n = \text{MasterSyncTime}_n + \text{MasterToSlaveDelay}$; $\text{MasterSyncTime}_n$ refers to time of transmission of the sync message from the master to the slave; MasterToSlaveDelay refers to transmission delay time during transmission of the sync message from the master to the slave; $\text{SlaveClockCount}_n = \text{SlaveClockTime}_n - \text{SlaveClockTime}_{n-1}$; $\text{SlaveClockTime}_n$ refers to time at which the slave has received the sync message from the master; and $\text{ClockDiffCount}_n = \text{MasterClockTime}_n - \text{SlaveClockTime}_n$.

If m is a time-independent present constant, Equation 2 is modified as in the following Equation 3.

$$\text{FreqScaleFactor}_n = \frac{\sum_{i=n-m+1}^{n} \text{MasterClockCount}_i}{\sum_{i=n-m+1}^{n} \text{SlaveClockCount}_i} + \frac{\text{ClockDiffCount}_n}{\text{SlaveClockCount}_n} \quad (3)$$

All parameters in Equation 3 have the same definitions as given above.

Accordingly, the time synchronization scheme based on the OFCC scheme supports separate compensation of frequency and offset, i.e. the frequency and time offset of the slave are separately compensated for, so that, in an network having stepwise bridges (switches), most errors accumulating along the synchronization path from the grand master node to the slave node can be compensated for.

Figure 5:
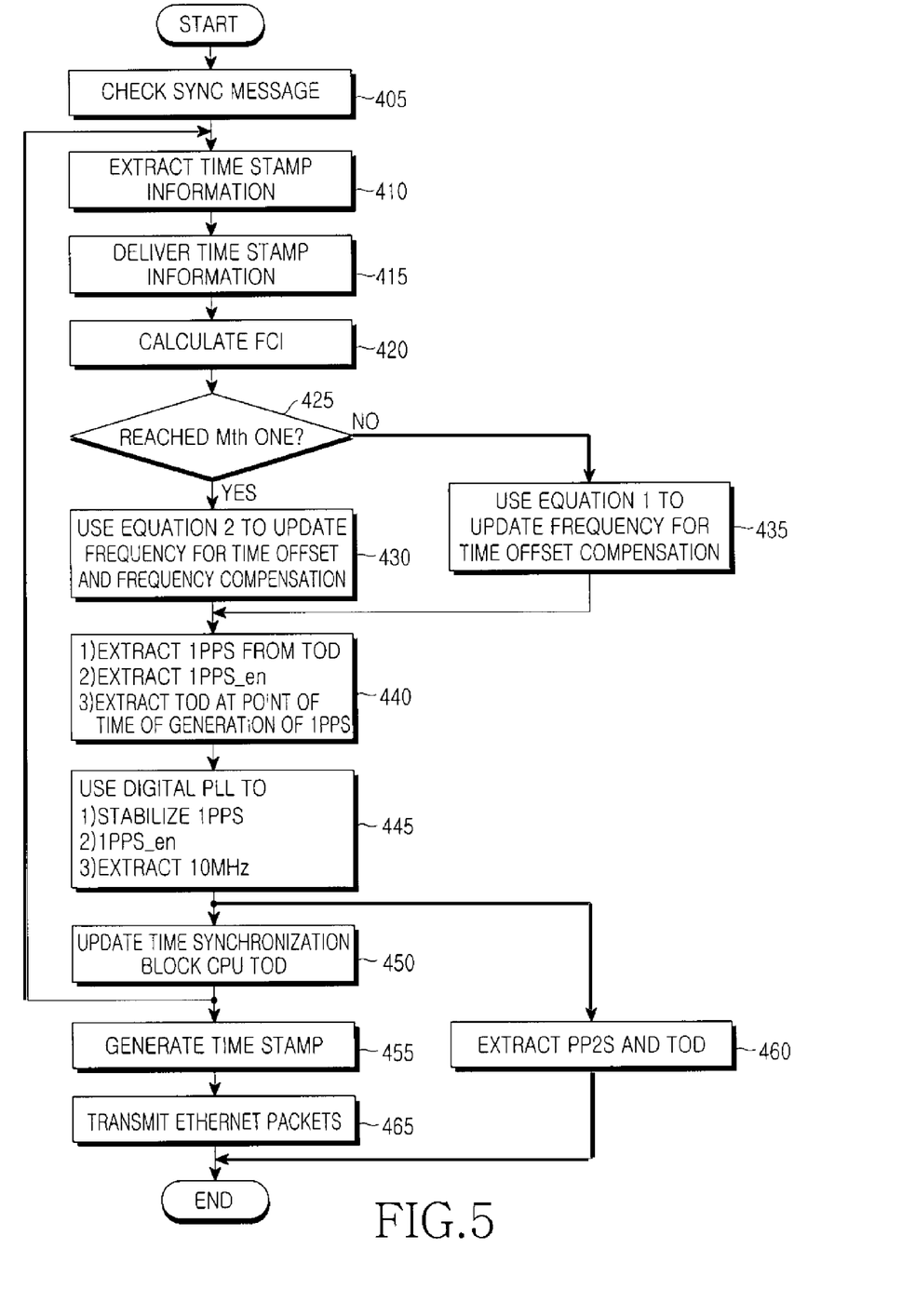
FIG. 5 is a flowchart showing time synchronization operations using OFCC synchronization technology by a slave node according to an exemplary embodiment of the present invention.

FIG. 5 is a flowchart showing examples of time synchronization operations using OFCC synchronization technology by a slave node according to an exemplary embodiment of the present invention. Time synchronization operations using OFCC synchronization technology by a slave node according to an exemplary embodiment of the present invention will be described in detail with reference to FIG. 5. When the slave node 30 receives a sync message for time synchronization from the master node via the Ethernet network, the sync detector 323 of the time synchronization block 320 positioned inside the slave node detects and identifies the received sync message according to IEEE 1588 standards in step 405. The master node may be a grand master node or another slave node.

At step 410, time stamp information is extracted from the received message, and the time stamp information is delivered to the CPU 321 in step 415.

At step 420, the FCI is calculated with regard to the point of time at which the corresponding sync message has been received by using OFCC synchronization technology, and it is confirmed if the calculated FCI corresponds to a preset FCI in following step 425.

In other words, at step 425 there is a confirmation if the currently received sync message is the $m^{th}$ one from the previous point of time of simultaneous compensation of frequency and time offset.

If it is confirmed in step 425 that the FCI corresponds to a preset FCI, the scaling factor calculation method defined in Equation (2) is used in following step 430 to update its own frequency to compensate for both time offset and frequency. However, if it is confirmed in step 425 that the FCI does not correspond to the preset FCI, the frequency scaling factor calculation method defined in Equation (1) is used in following step 435 to update its own frequency to compensate for time offset only.

In step 440, a 1PPS signal obtained from TOD information synchronized by the time synchronization block 320 of the slave node 30, a 1PPS_en signal, and TOD information at the point of time of generation of 1 PPS are extracted and delivered to the stabilization block 330 of the slave node 30.

At step 445, the stabilization block 330 stabilizes the 1PPS, 1PPS-en, TOD, and 10 MHz clock by using a digital PLL.

At step 450, the 1PPS, 1PPS_en, TOD information at the point of time of generation of the 1PPS, and 10 MHz clock, which have been stabilized by the stabilization block 330, are again delivered to the time synchronization block 320 to update TOD information of the CPU 321 inside the time synchronization block 320.

At step 455, the stabilized TOD information, which has been updated in step 450, is used to generate a time stamp for time synchronization of another slave node.

In step 465, the sync message is transmitted over the Ethernet network.

Concurrently with the operations in the above-mentioned steps 450, 455, and 465, the pulse and clock stabilized in step 445 are used to output a PP2S signal and TOD information by the slave node in step 460.

It is also possible to proceed from step 450 to step 410 and receive another sync message from the master node so that the above operations are repeated.

As mentioned above, application of the OFCC scheme is advantageous in that the inter-node phase error and the frequency accuracy/stability are substantially improved in the time synchronization block. This accuracy/stability increases the number of hops that can be transmitted after stabilization. However, the present invention is also applicable when methods proposed by IEEE 1588 are combined with stabilization blocks, instead of applying the OFCC scheme shown in FIG. 6, depending on the purpose of use.

Figure 6:
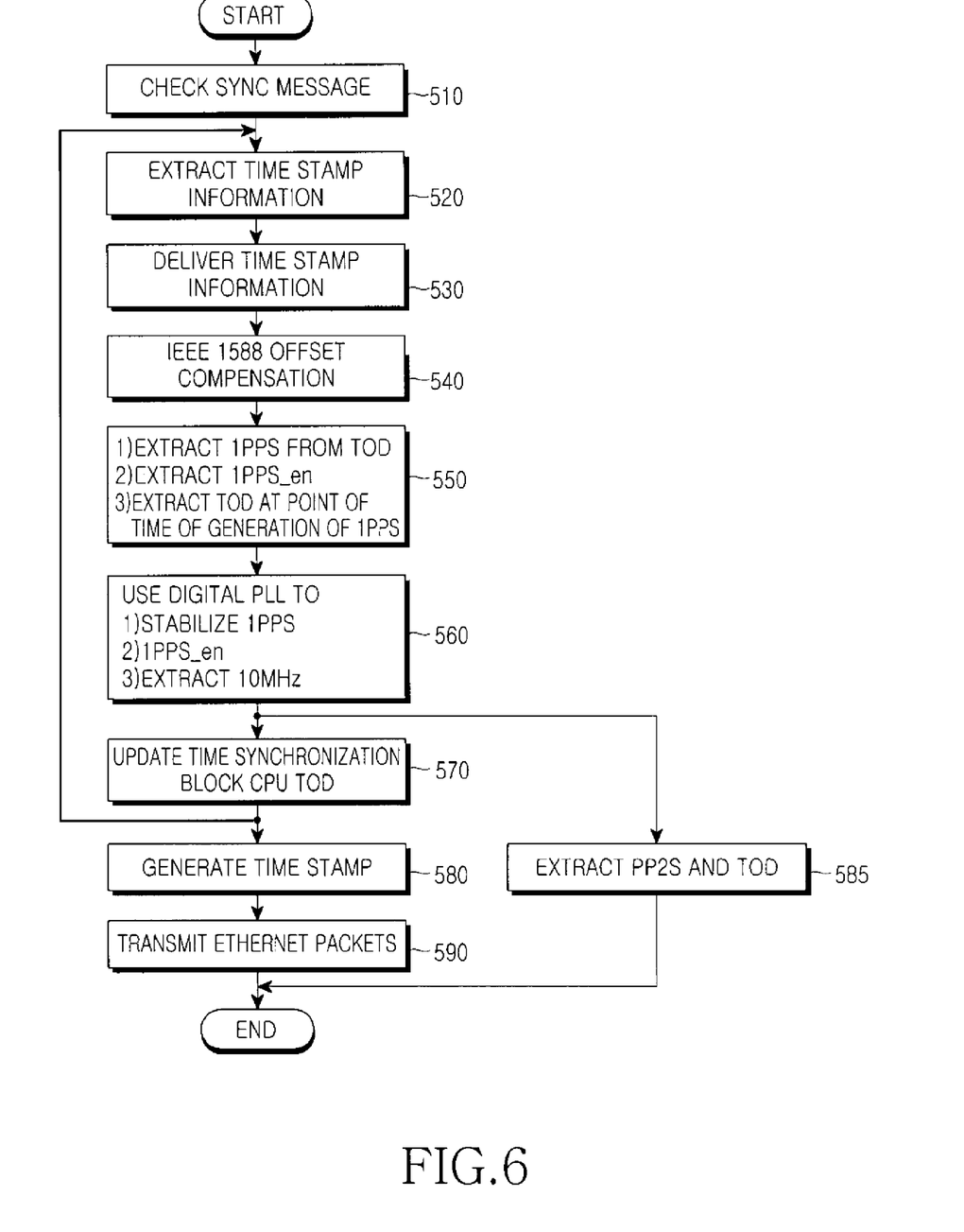
FIG. 6 is a flowchart showing time synchronization operations using IEEE 1588 standards by a slave node according to an exemplary embodiment of the present invention.

FIG. 6 is a flowchart showing examples of time synchronization operations using IEEE 1588 standards (for example, IEEE 1588 Version 1 (2002)) by a slave node according to another exemplary embodiment of the present invention. Time synchronization operations using IEEE 1588 standards by a slave node according to the exemplary embodiment of the present invention will be described with reference to FIG. 6.

When the slave node receives a sync message for time synchronization from the master node over the Ethernet network, the sync detector 323 of the time synchronization block 320 positioned inside the slave node detects and identifies the received sync message according to IEEE 1588 standards in step 510. The master node may be a grand master node or another slave node.

At step 520, time stamp information is extracted from the received message, and the time stamp information is delivered to the CPU 321 at step 530.

At step 540, an offset compensation operation is conducted based on IEEE 1588 standards.

At step 550, a 1PPS signal obtained from TOD information synchronized by the time synchronization block 320 of the slave node 30, a 1PPS_en signal, and TOD information at the point of time of generation of 1PPS are extracted and delivered to the stabilization block 330 of the slave node 30.

At step 560, the stabilization block 330 stabilizes the 1PPS, 1PPS-en, TOD, and 10 MHz clock by using a digital PLL.

At step 570, the 1PPS, 1PPS_en, TOD information at the point of time of generation of 1PPS, and 10 MHz clock, which have been stabilized by the stabilization block 330, are again delivered to the time synchronization block 320 to update TOD information of the CPU 321 inside the time synchronization block 320.

At step 580, the updated, stabilized TOD information is used to generate a time stamp for time synchronization of another slave node.

At step 590, the sync message is transmitted over the Ethernet network.

Concurrently with the operations in the above-mentioned steps 570, 580, and 590, the pulse and clock stabilized in step 560 are used to output a PP2S signal and TOD information by the slave node at step 585.

It is also possible to proceed from step 570 to step 520 and receive another sync message from the master node so that the above operations are repeated.

As mentioned above, the method and apparatus for time synchronization using GPS information in an Ethernet system according to the present invention are advantageous in that, even in the case of a base station not having a GPS receiver in an Ethernet system, accurate and stable time synchronization is possible. Therefore, small base stations or repeaters can be installed in indoor environments or downtown areas, where GPS signals are not properly received. The fact that small base stations can be realized without mounting GPS receivers is very favorable in terms of the system design cost.

While the invention has been shown and described with reference to certain exemplary embodiments thereof, it will be understood by those skilled in the art that various changes in form and details may be made therein without departing from the spirit and scope of the invention as defined by the appended claims. For example, while Global Position System (GPS) is described, the present invention is broader for compatibility with other types of positioning systems and is not limited to GPS. Moreover, signals, such as the 10 MHz clock signal, is at best a preference and can be different, as appreciated by a person of ordinary skill in the art. In addition, as systems such as GPS continue to advance, the invention is compatible with different rates other than the 1 Pulse Per Second disclosed in the examples.

In addition, while the time synchronization discussed in the examples herein is based on IEEE 1588 Version 1 (2002), such a standard and version are provided for illustrative purposes, and the scope of the claimed invention is broader and applicable to changes that may be made in subsequent versions of the standard without departing from the spirit of the invention and the scope of the appended claims.

What is claimed is:

1. A time synchronization method using Global Positioning System (GPS) information in a communication system, the method comprising the steps of:
   (a) extracting 1 Pulse Per Second (PPS), Time Of Day (TOD), 1PPS_en, and oscillator clocks by using GPS signals by a grand master node having a GPS receiver, stabilizing the extracted signals, generating a sync message for time synchronization by using the stabilized signals, and transmitting the sync message to a slave node;
   (b) receiving the sync message by the slave node and conducting a time synchronization operation by using Offset & Frequency Compensation Clock (OFCC) synchronization technology supporting separate compensation of time offset and frequency by a time synchronization block of the slave node so that TOD information of the time synchronization block is modified, wherein a time compensation interval (TCI) and a frequency compensation interval (FCI) are set so that the TCI comprises an interval of two adjacent sync messages and the FCI is longer than the TCI;
   (c) extracting 1PPS, TOD, and 1PPS_en signals by using the modified TOD information by the time synchronization block and delivering the extracted signals to a stabilization block of the slave node so that the extracted signals are stabilized; and
   (d) delivering the stabilized signals to the time synchronization block again to update TOD information of the time synchronization block and generating a sync message for time synchronization of a second slave node by using the updated TOD information.

2. The method as claimed in claim 1, wherein the oscillator clock comprises a 10 MHz frequency oscillator.

3. The method as claimed in claim 1, wherein the OFCC synchronization technology supporting separate compensation of time offset and frequency used by the slave node comprises the steps of:
   confirming if a preset frequency compensation interval has been reached by comparing a point of time of receiving the sync message from a master side with a previous frequency compensation time point;
   conducting only a time offset compensation operation upon confirming that the preset frequency compensation interval has not been reached; and
   conducting both time offset and frequency compensation operations upon confirming that the preset frequency compensation interval has been reached.

4. The method as claimed in claim 1, wherein the TOD signal extracted by using GPS signals by the grand master node is TOD information at a moment of generation of the 1PPS signal extracted in an identical process, and the TOD signal extracted by using the modified TOD information by the time synchronization block of the slave node is TOD information at a moment of generation of the 1PPS signal extracted in another identical process.

5. The method as claimed in claim 1, wherein the stabilization is conducted in step (c) by using digital Phase Locked Loop (PLL) so that clocks and pulses are stabilized.

6. The method as claimed in claim 1, wherein the sync message generated by the grand master node for time synchronization of the slave node is encapsulated in a PTP (Precision Time Protocol) scheme and is time-stamped according to IEEE 1588 Version 1 (2002) standards for transmission.

7. The method as claimed in claim 1, wherein the sync message generated by the slave node for time synchronization of the second slave node is encapsulated in a PTP scheme and is time-stamped according to IEEE 1588 Version 1 (2002) standards for transmission.

8. The method as claimed in claim 1, wherein the sync message received by the slave node has timestamp information processed according to IEEE 1588 standard Version 1 (2002).

9. The method as claimed in claim 2, wherein, after the slave node extracts and stabilizes 1PPS, TOD, and 1PPS_en signals by using the modified TOD information, the slave node generates and outputs PP2S (Pulse Per 2 Second) and 10 MHz clocks by using the modified TOD information.

10. A time synchronization apparatus using a Global Positioning System (GPS) information in a communication system, the apparatus comprising:
    a grand master node having a GPS receiver for extracting 1 Pulse Per Second (PPS), Time of Day (TOD), 1PPS_en, and oscillator clocks by using GPS signals received from the GPS receiver, for stabilizing the extracted signals, for generating a sync message for time synchronization of a slave node by using the stabilized signals, and for transmitting the sync message to the slave node;
    at least one slave node for receiving the sync message for time synchronization from the grand master node or from a second slave node, for conducting a time synchronization operation by using Offset & Frequency Compensation (OFCC) synchronization technology supporting separate compensation of time offset and frequency by a time synchronization block of the slave node so that TOD information of the time synchronization block is modified, for extracting 1PPS, TOD, and 1PPS_en signals by using the modified TOD information, for delivering the extracted signals to a stabilization block of the slave node to stabilize the extracted signals, for delivering the stabilized signals to the time synchronization block again to update TOD information of the time synchronization block, and for generating a sync message for time synchronization of a third slave node by using the updated TOD information; and
    wherein a time compensation interval (TCI) and a frequency compensation interval (FCI) used by the at least one slave node are set so that the TCI comprises an interval of two adjacent sync messages and the FCI is longer than the TCI.

11. The apparatus as claimed in claim 10, wherein the oscillator clock comprises a 10 MHz frequency Oven Controlled crystal Oscillator or a 10 MHz Temperature-Compensated Crystal Oscillator.

12. The apparatus as claimed in claim 10, wherein said grand master node having the GPS receiver comprises:
    a stabilization block comprising an alarm detector for detecting whether power functions are normal, a phase error detector for checking phase errors of received signals, a clock and timing generator for generating pulses and clocks required by the communication system, a discrete input/output interface for conducting signal input/output operations among the alarm detector, the phase error detector, and the clock and timing generator, and an oscillator for providing output signals having a stable oscillation frequency; and a time synchronization block comprising a network protocol stack for conducting communication according to a predetermined standard, a sync detector for detecting and identifying the sync message according to the predetermined standard, a time stamp generator for generating a time stamp according to the predetermined standard, and a CPU for controlling respective components during a time synchronization operation.

13. The apparatus according to claim 12, wherein the predetermined standard comprises IEEE 1588 standard Version 1 (2002).

14. The apparatus as claimed in claim 10, wherein the slave node comprises:

a time synchronization block comprising a network protocol stack for conducting communication according to a predetermined standard, a sync detector for detecting and identifying the sync message according to the predetermined standard, a time stamp generator for generating a time stamp according to the predetermined standard, and a CPU for controlling respective components during a time synchronization operation and conducting the time synchronization operation of the slave node by using the OFCC synchronization technology; and a stabilization block comprising an alarm detector for detecting if power is functioning normally, a phase error detector for checking phase errors of received signals, a clock and timing generator for generating pulses and clocks required by the communication system, a discrete input/output interface for conducting signal input/output operations among the alarm detector, the phase error detector, and the clock and timing generator, and an oscillator for providing output signals having a stable oscillation frequency.

15. The apparatus according to claim 14, wherein the predetermined standard comprises IEEE 1588 standard Version 1 (2002).

16. The apparatus as claimed in claim 10, wherein the OFCC synchronization technology confirms if a preset frequency compensation interval has been reached by comparing a point of time of receiving the sync message from a master side with a previous frequency compensation time point, conducts only a time offset compensation operation upon confirming that the preset frequency compensation interval has not been reached, and conducts both time offset and frequency compensation operations upon confirming that the preset frequency compensation interval has been reached.

17. The apparatus claimed in claim 10, wherein the TOD signal extracted by using GPS signals by the grand master node comprises TOD information at a moment of generation of the 1PPS signal extracted in an identical process, and the TOD signal extracted by using the modified TOD information by the time synchronization block of the slave node comprises TOD information at a moment of generation of the 1PPS signal extracted in another identical process.

18. The apparatus as claimed in claim 10, wherein the sync message generated by the grand master node for time synchronization of the slave node is encapsulated in a PTP (Precision Time Protocol) scheme and is time-stamped according to IEEE 1588 standard Version 1 (2002) for transmission.

19. The apparatus as claimed in claim 10, wherein the sync message generated by the slave node for time synchronization of the third slave node is encapsulated in a PTP scheme and is time-stamped according to IEEE 1588 standard Version 1 (2002) for transmission.

20. The apparatus as claimed in claim 10, wherein the sync message received by the slave node has time stamp information processed according to IEEE 1588 standard Version 1 (2002).

21. The apparatus as claimed in claim 10, wherein the extracted signals are stabilized using digital Phase Locked Loop (PLL).

* * * * *